United States Patent
Zivkovic

[15] 3,687,956
[45] Aug. 29, 1972

[54] N-HYDROXYALKYL, HYDROXYALKOXYALKYL AND HYDROXYALKOXYALKOXY-ALKYL DIPHENYL-METHYLENE-PIPERIDINES

[72] Inventor: Dusan Zivkovic, Rhode-Saint-Genese, Belgium

[73] Assignee: UCB Societe Anonyme, Saint-Gilles-leg-Bruzelles, Belgium

[22] Filed: April 6, 1970

[21] Appl. No.: 26,164

[30] Foreign Application Priority Data

April 9, 1969 Great Britain..........18,229/69

[52] U.S. Cl. ...260/293.83, 260/293.84, 260/293.75, 260/293.72, 260/294.9, 260/297 R, 424/267
[51] Int. Cl.............................................C07d 29/18
[58] Field of Search...260/294.7 R, 294.7 M, 293.83, 260/293.84

[56] References Cited

UNITED STATES PATENTS

| | | |
|---|---|---|
| 2,739,968 | 3/1956 | Sperber et al.......260/294.7 R |
| 3,024,234 | 3/1963 | Stern...................260/294.7 R |
| 3,108,111 | 10/1963 | Stern et al...........260/294.7 R |
| 3,530,126 | 9/1970 | Bernasconi et al.260/294.7 M |

FOREIGN PATENTS OR APPLICATIONS 548,012 10/1957 Canada..............260/294.7 M

*Primary Examiner*—Henry R. Jiles
*Assistant Examiner*—S. D. Winters
*Attorney*—Wenderoth, Lind & Ponack

[57] ABSTRACT

New diphenyl-methylene-piperidines acting upon the cardiovascular, pulmonary and central nervous systems and as antihistaminics and antiserotoninics, having the general formula

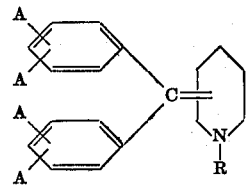

wherein A is hydrogen, halogen, cyano, halomethyl, alkyl or alkoxy and R is hydroxyalkyl, hydroxyalkoxyalkyl or hydroxyalkoxyalkoxyalkyl; and the pharmaceutically acceptable addition salts thereof.

11 Claims, No Drawings

N-HYDROXYALKYL, HYDROXYALKOXYALKYL AND HYDROXYALKOXYALKOXY-ALKYL DIPHENYL-METHYLENE-PIPERIDINES

The present invention is concerned with new piperidine derivatives and with the preparation thereof. It is also concerned with compositions containing the new piperidine derivatives and with the therapeutic use thereof.

The new piperidine derivatives according to the present invention are diphenyl-methylene-piperidines of the general formula:

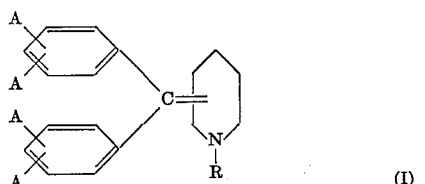

wherein A is a member selected from the group consisting of hydrogen, halogen, cyano, halomethyl, alkyl and alkoxy and R is a member selected from the group consisting of hydroxyalkyl, hydroxyalkoxyalkyl and hydroxyalkoxyalkoxyalkyl, the alkyl and alkoxy groups of which are straight or branched chained and contain up to four carbon atoms; and the addition salts thereof with phermaceutically acceptable acids.

The new compounds according to the present invention can be prepared by one of the following two methods:

a. condensation of a diphenyl-methylene-piperidine of the general formula:

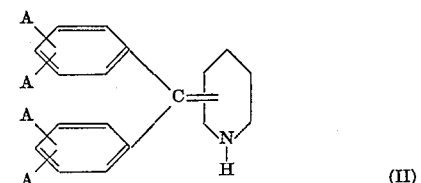

in which A has the same meaning as above with a compound of the general formula:

$$Z—R \qquad (III)$$

in which R has the same meaning as above and Z is a reactive group which is capable of reacting with the hydrogen atom on the nitrogen atom of the piperidine, Z preferably being a halogen atom;

b. submitting an alpha,alpha-diphenyl-N-R-piperidine-methanol of the general formula:

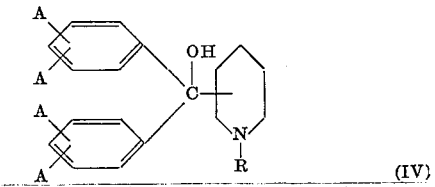

in which A and R have the same meanings as above, to the action of a dehydration agent, such as anhydrous hydrogen chloride in alcoholic solution.

The intermediates of general formula (II) can be prepared by the reduction of an alpha,alpha-diphenyl-pyridine-methanol of the general formula:

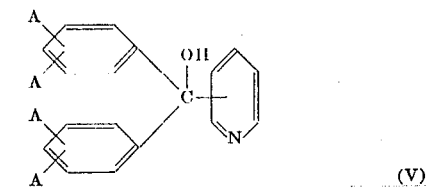

in which A has the same meaning as above, to give the corresponding alpha, alpha-diphenyl-piperidine-methanol of the general formula:

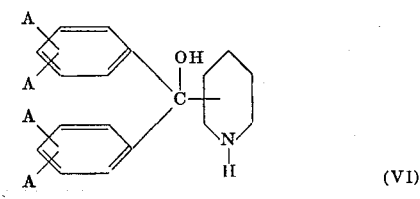

in which A has the same meaning as above, followed by dehydration to give the desired intermediate of general formula (II).

As far as the intermediates of general formula (IV) are concerned, they can be obtained by the condensation of an alpha,alpha-diphenyl-piperidine-methanol of the above-given general formula (VI) with a compound of the above-given general formula (III).

The new compounds (I) according to the present invention, either in the form of the free bases or in the form of addition salts with pharmaceutically acceptable inorganic and organic acids, are very strong pharmacological agents which act upon the cardiovascular, pulmonary and central nervous systems and can also be used as antihistaminics and as anti-serotoninics.

The following Examples are given for the purpose of illustrating the present invention:

EXAMPLE I

1-[2-(2-hydroxyethoxy)-ethyl]-4-(diphenyl-methylene)-piperidine

A mixture of 28 g. 4-(diphenyl-methylene)-piperidine and 25 g. 2-(2-chloroethoxy)-ethanol in 60 ml. xylene is heated for 8 hours at 120° C. in the presence of 17.5 g. anhydrous sodium carbonate.

After cooling, the reaction mixture is filtered and the filtrate is subsequently extracted with dilute hydrochloric acid (20 ml. concentrated hydrochloric acid and 70 ml. water). The acidic solution is separated, rendered alkaline with a concentrated solution of sodium hydroxide (about 35 ml. of 40 percent solution) and the base thus liberated is extracted with benzene. The benzene extract is washed with water and then dried over anhydrous sodium sulfate. The solution is then evaporated to dryness under reduced pressure.

The residue is dissolved in isopropanol and then converted into the hydrochloride. This melts at 221°–222° C., with decomposition.

Analysis:
$C_{22}H_{27}NO_2.HCl$

| | | |
|---|---|---|
| calc.: | Cl⁻ 9.48% | N 3.74% |
| found: | 9.58% | 3.72% |

The following piperidine derivatives are prepared in an analogous manner:

1-[2-(2-hydroxyethoxy)-ethyl]-4-(p-chloro-diphenyl-methylene)-piperidine

The corresponding hydrochloride, after recrystallization from isopropanol, melts at 209°–210° C.

Analysis:
$C_{22}H_{26}ClNO_2.HCl$

| | | | |
|---|---|---|---|
| calc.: total | Cl 17.36% | Cl⁻ 8.68% | N 3.43% |
| found: | 17.38% | 8.64% | 3.38% |

This compound is prepared from 4-(p-chloro-diphenyl-methylene)1piperidine (m.p. 72°–73° C.) which, in turn, is prepared by the dehydration of 4-(alpha-p-chlorophenyl-alpha-phenyl)-piperidine-methanol which is a known substance.

1-[2-(2-hydroxyethoxy)-ethyl]-4-(m-chloro-diphenyl-methylene)-piperidine

The corresponding hydrochloride, after recrystallization from isopropanol, has a melting point of 219°–220° C.

Analysis:
$C_{22}H_{26}ClNO_2.HCl$
calc.: total  Cl 17.36%   Cl⁻ 8.68%   N 3.43%
found:              17.77%        8.88%       3.48%

This compound is prepared from 4-(m-chloro-diphenylmethylene)-piperidine (m.p. 82°–83° C.), which, in turn, is prepared from 4-(alpha-m-chlorophenyl-alpha-phenyl)-piperidine-methanol (m.p. 132°–133° C.), this being obtained by the reduction of 4-alpha-m-chlorophenyl-alpha-phenyl)-pyridine-methanol (m.p. 180°–181° C.).

1-[2-(2-hydroxyethoxy)-ethyl]-4-(o-chloro-diphenyl-methylene)-piperidine

The corresponding hydrochloride, after recrystallization from isopropanol, melts at 243°–244° C.

Analysis:
$C_{22}H_{26}ClNO_2.HCl$
calc.: total  Cl 17.36%   Cl⁻ 8.68%   N 3.43%
found:              17.60%        8.87%       3.57%

This compound is prepared from 4-(o-chloro-diphenyl-methylene)-piperidine (b.p. 132°–134° C./0.001 mm.Hg.) which, in turn, is prepared by the dehydration of 4-(alpha-o-chlorophenyl-alpha-phenyl)-piperidine-methanol (m.p. 147°–149° C.), obtained by the reduction of 4-(alpha-o-chlorophenyl-alpha-phenyl)-pyridine-methanol (m.p. 202°–203° C.).

1-[2-(2-hydroxyethoxy)-ethyl]-4-(m-trifluromethyl-diphenyl-methylene)-piperidine The corresponding hydrochloride, after recrystallization from isopropanol, has a melting point of 200°–201° C.

Analysis:
$C_{23}H_{26}F_3NO_2.HCl$
calc.:   Cl⁻ 8.02%   F 12.89%   N 3.16%
found:        8.55%        12.80%       3.18%

This compound is prepared from 4-(m-trifluoromethyl-diphenyl-methylene)-piperidine (b.p. 113°–155° C./0.001 mm.Hg.; m.p. of the hydrochloride 191°–192° C.) which is synthesized by the dehydration of 4-alpha-(m-trifluoromethyl-phenyl-alpha-phenyl)-piperidine-methanol (m.p. of the hydrochloride 244°–245° C.), this, in turn, being obtained by the reduction of 4-(alpha-m-trifluoromethyl-phenyl-alpha-phenyl)-pyridine-methanol (m.p. 152°–153° C.).

1-[2-(2-hydroxyethoxy)-ethyl]-4-(p-fluoro-diphenyl-methylene)-piperidine

The corresponding hydrochloride, after recrystallization from isopropanol, melts at 192°–193° C.

Analysis:
$C_{22}H_{26}FNO_2.HCl$
calc.:   Cl⁻ 9.04%   F 4.8%   N 3.57%
found:        9.02%        4.82%    3.66%

This compound is prepared from 4-(p-fluoro-diphenyl-methylene)-piperidine (m.p. 84°–85° C.) which, in turn, is prepared by the dehydration of 4-(alpha-p-fluorophenyl-alpha-phenyl)-piperidine-methanol (m.p. 145°–146° C.), obtained by the reduction of 4-(alpha-fluorophenyl-alpha-phenyl)-pyridine-methanol (m.p. 195°–196° C.) which is either prepared from 4-benzoyl-pyridine and the bromide of p-fluorophenyl magnesium, or from 4-(p-fluorobenzoyl)-pyridine (m.p. 84°–85° C.; b.p. 170°–172° C./12 mm.Hg.) and the bromide of phenyl magnesium.

1-[2-(2-hydroxyethoxy)-ethyl]-4-(p-methyl-diphenyl-methylene)-piperidine

The corresponding hydrochloride, after recrystallization from isopropanol, melts at 213°–214° C.

Analysis:
$C_{23}H_{29}NO_2.HCl$
calc.:   Cl⁻ 9.14%   N 3.61%
found:         9.26%       3.56%

This compound is prepared from 4-)p-methyl-diphenyl-methylene)-piperidine (m.p. 64°–65° C.) which, in turn, is prepared by the dehydration of 4-(alpha-p-methylphenyl-alpha-phenyl)-piperidine-methanol (m.p. 140°–141° C.), obtained by the reduction of 4-(alpha-p-methylphenyl-alpha-phenyl)-pyridine-methanol (m.p. 195°–196° C.).

1-[2-(2-hydroxyethoxy)-ethyl]-4-(m-methyl-diphenyl-methylene)-piperidine

The corresponding hydrochloride, after recrystallization from isopropanol, melts at 217°–219° C.

Analysis:
$C_{23}H_{29}NO_2.HCl$
calc.:   Cl 9.14%   N 3.61%
found:        9.16%      3.62%

This compound is prepared from 4-(m-methyl-diphenyl-methylene)-piperidine (m.p. 77°14 78° C.) which is, in turn, obtained by the dehydration of 4-(alpha-m-methylphenyl-alpha-phenyl)-piperidine-methanol (m.p. 117°–118° C.), prepared by the reduction of 4-(alpha-m-methylphenyl-alpha-phenyl)-pyridine-methanol (m.p. 178°–179° C.).

1-[2-(2-hydroxyethoxy)-ethyl]-3-(diphenyl-methylene)-piperidine

The corresponding hydrochloride, after recrystallization from isopropanol, melts at 180°–181° C.

Analysis:
$C_{22}H_{27}NO_2.HCl$
calc.:   Cl⁻ 9.48%   N 3.74%
found:         9.65%       3.73%

This compound is prepared from 3-(diphenyl-methylene)-piperidine (m.p. 87°–88° C.) which, in turn, is prepared from 3-alpha,alpha-diphenyl-piperidine-methanol.

1-[2-(2-hydroxyethoxy)-ethyl]-4-(4-chloro-4'-fluoro-diphenyl-methylene)-piperidine The corresponding hydrochloride, after recrystallization from isopropanol, melts at 204°–205° C.

Analysis:
$C_{22}H_{25}ClFNO_2.HCl$
calc.: total  Cl 16.62%   Cl⁻ 8.31%   F 4.45%   N 3.28%
found:              16.70%        8.38%        4.60%       3.31%

This compound is prepared from 4-(4-chloro-4'-fluoro-diphenyl-methylene)-piperidine (m.p. 103°–104° C.) which, in turn, is obtained by the dehydration of 4-(alpha-4-chlorophenyl-alpha-4'-fluorophenyl)-piperidine-methanol (m.p. 144°–145° C.), prepared by the reduction of 4-(alpha-4-chlorophenyl-alpha-4'-fluorophenyl)-pyridine-methanol (m.p. 182°–183° C.)

1-[2-(2-hydroxyethoxy)-ethyl]-4-(p-trifluoromethyl-diphenyl-methylene)-piperidine The corresponding hydrochloride, after recrystallization from isopropanol, melts at 202°–203° C.

Analysis:
$C_{23}H_{26}F_3NO_2.HCl$
calc.:      Cl⁻ 8.02%      F 12.89%      N 3.13%
found:      8.16%          12.90%        3.19%

This compound is prepared from 4-(p-trifluoromethyl-diphenyl-methylene)-piperidine (b.p. 107°–109° C./0.001 mm.Hg.) which, in turn, is prepared by the dehydration of 4-alpha-p-trifluoromethyl-phenyl-alpha-phenyl-piperidine-methanol (m.p. 167°–169° C. after recrystallization from isopropanol), obtained by the reduction of 4-alpha-p-trifluoromethyl-phenyl-alpha-phenyl-pyridine-methanol (m.p. 157°–158° C. after recrystallization from isopropanol).

1-[2-(2-hydroxyethoxy)-ethyl]-4-(p-t-butyl-diphenyl-methylene)-piperidine

The corresponding hydrochloride, after recrystallization from isopropanol, melts at 203°–204° C.

Analysis:
$C_{26}H_{35}NO_2.HCl$
calc.:      Cl⁻ 8.24%      N 3.25%
found:      8.22%          3.24%

Intermediate compounds 4-p-t-butyl-diphenyl-methylene-piperidine (m.p. 95°–97° C. after recrystallization from petroleum ether b.p. 40°–60° C.)

4-alpha-p-t-butyl-phenyl-alpha-phenyl-piperidine-methanol (m.p. 90°–92° C. after recrystallization from petroleum ether b.p. 40°–60° C.)

4-alpha-p-t-butyl-phenyl-alpha-phenyl-pyridine-methanol (m.p. 188°–189° C. after recrystallization from benzene).

1-[2-(2-hydroxyethoxy)-ethyl]-4-(3,4-dimethyl-diphenyl-methylene)-piperidine

The corresponding hydrochloride, after recrystallization from isopropanol, melts at 219°–220° C.

Analysis:
$C_{24}H_{31}NO_2.HCl$
calc.:      Cl⁻ 8.82%      N 3.48%
found:      8.90%          3.36%

Intermediate products 4-(3,4-dimethyl-diphenyl-methylene)-piperidine (m.p. 96°–98° C. after recrystallization from petroleum ether b.p. 40°–60° C.)

4-alpha-(3,4-dimethylphenyl)-alpha-phenyl-piperidine-methanol (m.p. of the corresponding hydrochloride, after recrystallization from isopropanol, 223°–224° C.)

4-alpha-(3,4-dimethylphenyl)-alpha-phenyl-pyridine-methanol (m.p. 161°–162° C. after recrystallization from ethanol).

1-[2-(2-hydroxyethoxy)-ethyl]-4-(p-methoxy-diphenyl-methylene)-piperidine

The corresponding hydrochloride, after recrystallization from isopropanol, melts at 207°–208° C.

Analysis:
$C_{23}H_{29}NO_3.HCl$
calc.:      Cl⁻ 8.77%      N 3.46%
found:      8.87%          3.48%

Intermediate products 4-p-methoxy-diphenyl-methylene-piperidine (m.p. 89°–90 C. after recrystallization from petroleum ether b.p. 40°–60° C.)

4-alpha-p-methoxyphenyl-alpha-phenyl-piperidine-methanol (which is a known substance).

1-[2-(2-hydroxyethoxy)-ethyl]-4-(o-methoxy-diphenyl-methylene)-piperidine

The corresponding hydrochloride, after recrystallization from isopropanol, melts at 205°–206° C.

Analysis:
$C_{23}H_{29}NO_3.HCl$
calc.:      Cl⁻ 8.77%      N 3.46%
found:      8.80%          3.60%

Intermediate products 4-o-methoxy-diphenyl-methylene-piperidine (b.p. 128°–130° C./0.001 mm.Hg.)

4-alpha-o-methoxyphenyl-alpha-phenyl-piperidine-methanol (m.p. 104°–105° C. after recrystallization from petroleum ether b.p. 40°–60° C.) 4-alpha-o-methoxyphenyl-alpha-phenyl-pyridine-methanol (m.p. 132°–133° C. after recrystallization from isopropanol.

1-{2-[2-(2-hydroxyethoxy)-ethoxy]-ethyl}-4-(diphenyl-methylene)-piperidine

The corresponding hydrochloride, after recrystallization from isopropanol, melts at 144°–145° C.

Analysis:
$C_{24}H_{31}NO_3.HCl$
calc.:      Cl⁻ 8.48%      N 3.35%
found:      8.49%          3.33%

1-{2-[2-(2-hydroxyethoxy)-ethoxy]-ethyl}-4-(p-fluoro-diphenyl-methylene)-piperidine The corresponding hydrochloride, after recrystallization from ethyl-acetate, melts at 130°–132° C.

Analysis:
$C_{24}H_{30}FNO_3.HCl$
calc.:      Cl⁻ 8.13%      F 4.36%      N 3.21%
found:      8.07%          4.35%        3.18%

1-{2-[2-(2-hydroxyethoxy)-ethoxy]-ethyl}-4-(p-trifluoromethyl-diphenyl-methylene)-piperidine The corresponding hydrochloride, after recrystallization from isopropanol, melts at 120°–121° C.

Analysis:
$C_{25}H_{30}F_3.HCl$
calc.:      Cl⁻ 7.29%      F 11.7%      N 2.88%
found:      7.33%          11.9%        2.87%

1-{2-[2-(2-hydroxyethoxy)-ethoxy]-ethyl}-4-(m-trifluoromethyl-diphenyl-methylene)-piperidine The corresponding fumarate, after recrystallization from isopropanol, melts at 135°–136° C.

Analysis:
$C_{25}H_{30}F_3NO_3.C_4H_4O_4$ calc.:     F 10.07%     N 2.47%
found:     10.14%     2.49%

1-{2-[2-(2-hydroxyethoxy)-ethoxy]-ethyl}-4-(p-chloro-diphenyl-methylene)-piperidine The corresponding fumarate, after recrystallization from isopropanol, melts at 102°–103° C.

Analysis:
$C_{24}H_{30}ClNO_3 \cdot C_4H_4O_4$
calc.:     Cl 6.66%     N 2.63%
found:     6.30%     2.59%

1-(2,3-dihydroxypropyl)-4-(diphenyl-methylene)-piperidine

The corresponding hydrochloride, after recrystallization from isopropanol, melts at 211°–212° C.

Analysis:
$C_{21}H_{25}NO_2 \cdot HCl$
calc.:     Cl⁻ 9.85%     N 3.89%
found:     9.74%%     3.86%

1-(2-hydroxyethyl)-4-(diphenyl-methylene)-piperidine

The corresponding hydrochloride, after recrystallization from isopropanol, melts at 229°–230° C.

Analysis:
$C_{20}H_{23}NO \cdot HCl$
calc.:     Cl⁻ 10.74%     N 4.24%
found:     10.26%     4.26%

1-(2-hydroxyethyl)-4-(p-chloro-diphenyl-methylene)-piperidine

The corresponding hydrochloride, after recrystallization from isopropanol, melts at 185°–186° C.

Analysis:
$C_{20}H_{22}ClNO \cdot HCl$
calc.:     Cl⁻ 9.73%     total Cl 19.46%     N 3.84%
found:     9.92%     19.83%     3.85%

1-(2-hydroxyethyl)-4-(p-fluoro-diphenyl-methylene)-piperidine

The corresponding hydrochloride, after recrystallization from isopropanol, melts at 217°–218° C.

Analysis:
$C_{20}H_{22}FNO \cdot HCl$
calc:     Cl⁻ 10.19%     F 5.46%     N 4.27%
found:     10.48%     5.42%     3.99%

1-(2-hydroxyethyl)-4-(o-methoxy-diphenyl-methylene)-piperidine

The corresponding hydrochloride, after recrystallization from isopropanol, melts at 190°–191° C.

Analysis:
$C_{21}H_{25}NO_2 \cdot HCl$
calc.:     Cl⁻ 9.85%     N 3.89%
found:     10.20%     3.80%

1-(2-hydroxyethyl)-4-(m-methyl-diphenyl-methylene)-piperidine

The corresponding hydrochloride, after recrystallization from isopropanol, melts at 201°–202° C.

Analysis:
$C_{21}H_{25}NO \cdot HCl$
calc.:     Cl⁻ 10.31%     N 4.07%
found:     10.34%     4.02%

1-(3-hydroxypropyl)-4-(diphenyl-methylene)-piperidine

The corresponding hydrochloride, after recrystallization from isopropanol, melts at 190°–191° C.

Analysis:
$C_{21}H_{25}NO \cdot HCl$
calc.:     Cl⁻ 10.31%     N 4.07%
found:     10.48%     4.01%

1-(4-hydroxybutyl)-4-(diphenyl-methylene)-piperidine

The corresponding hydrochloride, after recrystallization from isopropanol, melts at 185°–186° C.

Analysis:
$C_{22}H_{27}NO \cdot HCl$
calc.:     Cl⁻ 9.90%     N 3.91%
found:     9.86%     3.91%

1-(2-hydroxyethyl)-3-(diphenyl-methylene)-piperidine

The corresponding hydrochloride, after recrystallization from isopropanol, melts at 164°–165° C.

Analysis:
$C_{20}H_{23}NO \cdot HCl$
calc.:     Cl⁻ 10.74%     N 4.24%
found:     11.1%     4.22%

1-(3-hydroxypropyl)-3-(diphenyl-methylene)-piperidine

The corresponding hydrochloride, after recrystallization from isopropanol, melts at 176°–177° C.

Analysis:
$C_{21}H_{25}NO \cdot HCl$
calc.:     Cl⁻ 10.31%     N 4.07%
found:     10.26%     4.02%

1-{2-[2-(2-hydroxyethoxy)-ethoxy]-ethyl}-4-(4-chloro-diphenyl-methylene)-piperidine The corresponding fumarate, after recrystallization from isopropanol, melts at 102°–103° C.

Analysis:
$C_{24}H_{30}ClNO_3 \cdot C_4H_4O_4$
calc.:     Cl 6.66%     N 2.63%
found:     5.52%     2.59%

1-{2-[2-(2-hydroxyethoxy)-ethoxy]-ethyl}-4-(3-trifluoromethyl-diphenyl-methylene)-piperidine The corresponding fumarate, after recrystallization from isopropanol, melts at 135°–136° C.

Analysis:
$C_{25}H_{30}F_3NO_3 \cdot C_4H_4O_4$
calc.:     F 10.07%     N 2.47%
found:     10.14%     2.47%

EXAMPLE 2

1-[2-(2-hydroxyethoxy)-ethyl]-4-(diphenyl-methylene)-piperidine

The preparation of this compound has already been described in Example 1. It can also be prepared by the dehydration of 1-[2-(2-hydroxyethoxy)-ethyl]-4-(alpha,alpha-diphenyl)-piperidine-methanol in the following manner:

A solution of 5 g. 1-[2-(2-hydroxyethoxy)-ethyl]-4-(alpha,alpha-diphenyl)-piperidine-methanol hydrochloride in 500 ml. ethanol is saturated in the cold with gaseous hydrogen chloride. After leaving to stand overnight, the reaction mixture is boiled under reflux for 20 minutes.

The reaction mixture is then evaporated to dryness and the residue recrystallized from isopropanol. The product obtained has a melting point of 221°–222° C.

Analysis:
$C_{22}H_{27}NO_2.HCl$
calc. :   Cl⁻ 9.48%   N 3.74%
found :   9.48%   3.78%

The 1-[2-(2-hydroxyethoxy)-ethyl]-4-(alpha,alpha-diphenyl)-piperidine-methanol, which is here used as starting material, is prepared from 4-(alpha,alpha-diphenyl)-piperidine-methanol and 2-(2-chloroethoxy)-ethanol in the manner described in Example 1 for the condensation of the same chlorhydrin with 4-(diphenyl-methylene)-piperidine. After recrystallization from isopropanol, the corresponding hydrochloride has a melting point of 229°–230° C.

The following compounds have been prepared by the same method:

1-[2-(2-hydroxyethoxy)-ethyl]-3-(diphenyl-methylene)-piperidine (The preparation of this compound by the first method has already been described in Example 1).

Four g. 1-[2-(2-hydroxyethoxy)-ethyl]-3-alpha,alpha-diphenyl-piperidine-methanol hdyrochloride are dissolved in 100 ml. ethanol. The solution is saturated in the cold with gaseous hydrogen chloride, then it is boiled under reflux for about 4 hours. The residue after evaporation under vacuum on the water-bath is crystallized from isopropanol.

The corresponding hydrochloride of the obtained product melts at 180°–181° C. (no depression of m.p. when this compound is mixed with the one obtained by the first method).

Analysis:
$C_{22}H_{27}NO_2.HCl$
calc. :   Cl⁻ 9.48%   N 3.74%
found :   10.09%   3.77%

The 1-[2-(2-hydroxyethoxy)-ethyl]-3-alpha,alpha-diphenyl-piperidine-methanol used as starting material was itself prepared from 3-alpha,alpha-diphenyl-piperidine-methanol and 2-(2-chloroethoxy)-ethanol in the manner described in Example 1 for the condensation of the same chlorhydrin with 4-diphenyl-methylene-piperidine.

After recrystallization from isopropanol, the corresponding hydrochloride of the obtained product melts at 147°–148° C.

Analysis:
$C_{22}H_{29}NO_3.HCl$
calc. :   Cl⁻ 9.04%   N 3.57%
found :   9.11%   3.49%

1-(2-hydroxyethyl)-2-(diphenyl-methylene)-piperidine.

A solution of 10 g. 1-(2-hydroxyethyl)-2-alpha,alpha-diphenyl-piperidine-methanol hydrobromide in 100 ml. concentrated hydrobromic acid is heated for 4 hours at 100° C. The reaction mixture is cooled in an ice-salt mixture and the supernatant solution is decanted. The residue is twice evaporated to dryness under vacuum on the water-bath, while adding each time 50 ml. isopropanol. The residue is finally crystallized from acetone. The corresponding hydrobromide of the obtained product melts at 283°–284° C.

Analysis:
$C_{20}H_{23}NO.HBr$
calc. :   Br⁻ 21.34%   N 3.74%
found :   21.92%   2.70%

The 1-(2-hydroxyethyl)-2-alpha,alpha-diphenyl-piperidine-methanol used as starting material is prepared as follows:

A mixture of 20 g. 2alpha,alpha-diphenyl-piperidine-methanol, 30 g. ethylene bromohydrin and 12 g. anhydrous sodium carbonate is heated for 6 hours at 90°–95 C. After cooling, 40 ml. benzene are added, the suspension is filtered, washed with benzene then with water and is dried. The corresponding hydrobromide of the obtained product melts at 224°–225° C.

Analysis:
$C_{20}H_{25}NO_2.HBr$
calc. :   Br⁻ 20.37%   N 3.57%
found :   19.76%   3.56%

EXAMPLE 3

Pharmacologic Tests

In these tests, use was made of the following compounds according to the invention:

compound I: 1-[2-(2-hydroxyethoxy)-ethyl]-4-(diphenyl-methylene)-piperidine.

compound II: 1-[2-(2-hydroxyethoxy)-ethyl]-4-(p-chloro-diphenyl-methylene)-piperidine.

compound III: 1-[2-(2-hydroxyethoxy)-ethyl]-4-(m-chloro-diphenyl-methylene)-piperidine.

compound IV: 1-[2-(2-hydroxyethoxy)-ethyl]-4-(o-chloro-diphenyl-methylene)-piperidine.

compound V: 1-[2-(2-hydroxyethoxy)-ethyl]-4-(p-fluoro-diphenyl-methylene)-piperidine.

compound VI: 1-[2-(2-hydroxyethoxy(-ethyl]-4-(p-methyl-diphenyl-methylene)-piperidine.

compound VII: 1[2-(2-hydroxyethoxy)-ethyl]-4-(m-methyl-diphenyl-methylene)-piperidine.

compound VIII: 1-[2-(2-hydroxyethoxy)-ethyl]-4-(p-methoxy-diphenyl-methylene)-piperidine.

compound IX: 1-[2-(2-hydroxyethoxy)-ethyl]4-(o-methoxy-diphenyl-methylene)-piperidine.

compound X: 1-{2-[2-(2-hydroxethoxy)-ethoxy]-ethyl}-4-(diphenyl-methylene)-piperidine.

compound XI: 1-{2-[2-(2-hydroxyethoxy)-ethoxy]-ethyl}-4-(p-fluoro-diphenyl-methylene)-piperidine.

compound XII: 1-(2-hydroxyethyl)-4-(diphenyl-methylene)-piperidine.

Compound XIII: 1-(2-hydroxyethyl-4-(p-fluoro-diphenyl-methylene)-piperidine.

compound XIV: 1-[2-(2-hydroxyethoxy)-ethyl]-4-(m-trifluoromethyl-diphenyl-methylene)-piperidine.

compound XV: 1-[2-(2-hydroxyethoxy)-ethyl]-4-(p-chloro-p'-fluoro-diphenyl-methylene)-piperidine.

Bronchodilating effects

1. In bronchitic dogs

Method: The dogs are rendered bronchitic by exposure to $SO_2$ (cfr. J. LULLING, J. PRIGNOT, P. LIEVENS, Arch.Pharmak.u.exp.Path.261, (1968),1–25). In these animals, the viscous resistance (R) of the respiratory tract is particularly high.

Results: A very distinct decrease of the resistance (R), exceeding 50 percent, is obtained after administration of compound I (2 mg./kg. intravenously) or compound X (0.1 mg./kg. intravenously or 1 mg./kg. per os).

A less important decrease (30 percent) was found after administration of compounds XI and XII (0.32 mg./kg. intravenously).

A similar effect is obtained after intravenous administration of theophylline at the dose of 4 mg./kg.

2. In guinea-pigs

Method: A variant of the Konzett-Rossler method (cfr. H. KONZETT and R. ROSSLER, Arch.expo.Path.Parmakol,195,(1940),71–74) is applied. The anesthetized and curarized guinea-pig is subjected to artificial respiration. The endotracheal pressure is recorded. Repeated bronchial spasms are induced by successive intravenous injections of acetycholine, histamine or serotonine. The 50 percent efficaceous dose (ED 50) that inhibits these spasms is calculated.

Results: The ED 50 towards the various induced bronchospasms are given in the following Table.

These substances prove to have a moderate antibronchoconstricting effect towards acetylcholine and considerable antagonistic effects towards histaminic and particularly serotoninic bronchospasms.

ED 50 (in mg./kg.)

| Compound | Serotonine | Acetylcholine | Histamine |
|---|---|---|---|
| I | 0.0075 | 1.5 | 0.030 |
| II | 0.065 | 9 | 0.1 |
| IV | 0.048 | 2.1 | 0.17 |
| V | 0.01 | 8.5 | 0.065 |
| VI | 0.003 | 9 | 0.1 |
| VII | 0.0045 | 4.5 | 0.1 |
| VIII | 0.013 | 7.8 | 0.043 |
| IX | 0.004 | 2.45 | 0.23 |
| X | 0.007 | 0.65 | 0.07 |
| XI | 0.01 | 1.6 | 0.076 |
| XII | 0.039 | 3.6 | 0.11 |
| XIII | 0.018 | 5.2 | 0.007 |
| XIV | 0.0045 | 8 | 0.55 |
| Theophylline | 3.5 | 7 | 3.5 |

Antihistaminic activity

The antihistaminic activity of these substances has been studied in guinea-pigs by the BOVET and STAUB method (C.R.Soc.Biol.124,(1937),547) as modified by S. LEVIS et al. (Arch.Intern.Pharmacod.109,(1957),1 28). This test consists in determining the number of toxic doses of intravenously injected histamine that are neutralized by the previous administration of an antihistaminic agent. The extent and the duration of this activity are evaluated.

The substances to be tested are administered intravenously (2.5 mg./kg.) or orally (2.5 mg./kg.,per catheter).

In the control animals, the minimum dose of intravenously administered histamine hydrochloride that kills 100 percent of guinea-pigs, of 300 to 400 g. body weight, varies between 0.4 and 0.5 mg./kg.

The results are given in the following Table:

Toxic doses of histamine neutralized

| Compound | after 1 hour intravenously | after 1 hour orally | after 4 hours intravenously | after 4 hours orally |
|---|---|---|---|---|
| I | 600 | | | |
| II | 600 | 600 | | |
| III | 1200 | 1000 | | |
| V | 1200 | 1000 | | |
| X | 800 | | 1000 | |
| XI | 1000 | | | |
| XV | 600 | 600 | 400 | 600 |

The activity of compound XV, after 24 hours, is still 400 (when administered intravenously) and 600 (when administered orally).

Circulatory effects "in vivo"

Method: In anesthetized dogs, subjected to artificial respiration, the hemodynamic effects are studied under the experimental conditions described by WELLENS and WAUTERS (Arch.int.Pharmacodyn.171, (1968),246–250). The cardiac, musculo-cutaneous and cerebral outputs are measured by means of periarterial probes placed respectively around the aorta and the femoral and vertebral arteries.

Results:

The musculo-cutaneous peripheric output is considerably stimulated by most of the tested compounds. A significant increase (more than 20 percent, during more than 20 minutes) is observed after intravenous administration of 1 mg./kg. of compounds I and V, and of 2 mg./kg. of compounds II, VI, X, XI, XII and XIV. In certain cases, the increase in femoral output is very important (50 to 100 percent) and may last more than 1 or 2 hours. Such effects are observed after administration of compound V (0.1 to 2 mg./kg. intravenously or 2 to 10 mg./kg. intraduodenally).

Because of its physiologic regulation, the cerebral output cannot be subjected to variations that are as important as those observed in the musculo-cutaneous circulation.

A moderate but significant increase in cerebral output is produced by several of the tested compounds, particularly by compound V (1 mg./kg. intravenously) and compound XII (2 mg./kg. intravenously).

The vasodilating effects on femoral and cerebral circulation are relatively specific, in the sense that they are accompanied by a much lesser or even nil stimulation of the cardiac output.

In the same experimental conditions, theophylline does not appreciably increase the femoral output; on the other hand, it produces a high increase of cerebral output, but only at the intravenous dose of 20 mg./kg. This latter effect is accompanied by an important acceleration of cardiac rhythm.

Conclusion:

The tested compounds according to the invention have a benefic effect on blood supply in the musculo-cutaneous and cerebral regions.

Coronarodilating effect as measured by the Langendorff method

Method: the isolated heart of rabbit is fibrillated by electric stimulation. The coronary region is perfused by cannulation of the aorta. The perfusion pressure is constant and the output of the perfusion liquid (tyrode) is measured.

Results: These are given in the following Table:

| Compound | Concentration µg./ml. | Increase of output in % | Number of animals |
|---|---|---|---|

| | | | |
|---|---|---|---|
| I | 1 | 37 | 12 |
| | 2 | 65 | 12 |
| | 5 | 134 | 12 |
| | 20 | 148 | 12 |
| II | 5 | 113 | 12 |
| | 20 | 145 | 12 |
| III | 5 | 103 | 12 |
| IV | 5 | 81 | 12 |
| V | 1 | 24 | 12 |
| | 2 | 55 | 12 |
| | 5 | 142 | 12 |
| | 20 | 116 | 12 |
| VI | 5 | 119 | 9 |
| VII | 5 | 121 | 9 |
| | 20 | 172 | 12 |
| X | 5 | 75 | 12 |
| | 20 | 153 | 12 |
| Theophylline | 20 | 31 | 12 |
| | 50 | 39 | 12 |
| | 100 | 76 | 12 |
| | 200 | 147 | 12 |

Conclusion: In this test, the various compounds have a very important coronarodilating effect, which by far outpasses that of theophylline.

Effects on the central nervous system

The activity of the compounds according to the invention on the central nervous system has been determined by means of the following tests:

Potentiation of pentobarbital: P. JANSSEN, C. VAN DE WESTERINGH, A. JAGUENAU, P. DEMOEN, B. HERMANS, G. VAN DAELE, K. SCHELLEKENS, C. VAN DER EYCKEN, C. NIEMEGEERS, J.Med.Pharm.Chem.1(1959), 281–297.

Rotating rod: N.W. DUNHAM, T.S. MIYA, J.Am.Pharm.Assoc.46,(1957),208–209.

Behavior (exciting or sedative): S. IRWIN, Gordon Research Conference on Medicinal Chemistry, Aug. (1959), 3–7, Colby Junior College, New London).

Electro-encephalogram (abbreviated EEG): S. GIURGEA and MOEYERSOONS, Med.Exp. 8,(1963),66.

The results obtained by these tests are summarized in the following Table:

| Compound | Potentiation of pentobarbital | | Rotating rod | | Behavior exc. | Behavior sed. | EEG |
|---|---|---|---|---|---|---|---|
| I | M O | 14 | R P | 31 | + | + | sedative |
| II | M O | 44 | R P | 13.5 | + | | sedative |
| IV | M O | 14 | R P | 33 | + | | |
| V | M O | 7 | R P | 21 | + | + | active |
| VIII | M O | 5 | R P | 16 | + | + | |
| X | M O | 9 | | | + | + | |
| XV | M O | 16.5 | R P | 10.5 | + | + | |

Signification of the letters and numerical values:

M = mouse; O = oral administration; R = rat; P = parenteral administration; the numerical values are expressed in mg./kg. animal body weight; the smaller the numeric value, the more the tested compound proves to be active.

Whether free bases or salts or inorganic or organic pharmaceutically acceptable acids, the compounds according to the invention may be administered orally, rectally or parenterally at unit doses of 10 to 60 mg. and, in accordance with the mode of administration, in association with adjuvants and solvents commonly used in pharmacy.

I claim:

1. A diphenyl-methylene-piperidine of the formula:

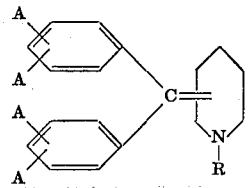

wherein
A is a member selected from the group consisting of hydrogen, halogen, cyano, halomethyl, alkyl and alkoxy, and
R is a member selected from the group consisting of hydroxyalkyl, hydroxyalkoxyalkyl and hydroxyalkoxyalkoxyalkyl, each alkyl and alkoxy containing one to four carbon atoms;
or an addition salt thereof with pharmaceutically acceptable acids.

2. 1-[2-(2-hydroxyethoxy)-ethyl]-4-(p-fluoro-diphenyl-methylene)-piperidine.

3. 1-{2-[2-(2-hydroxyethoxy)-ethoxy]-ethyl}-4-(diphenyl-methylene)-piperidine.

4. 1-[2-(2-hydroxyethoxy)-ethyl]-4-(p-chloro-diphenyl-methylene)-piperidine.

5. 1-[2-(2-hydroxyethexy)-ethyl]-4-(diphenyl-methylene)-piperidine.

6. 1-{2-[2-(2-hydroxyethoxy)-ethexy]-ethyl}-4-(p-fluoro-diphenyl-methylene)-piperidine.

7. 1-[2-(2-hydroxyethoxy)-ethyl]-4-(p-methoxy-diphenyl-methylene)-piperidine.

8. 1-[2-(2-hydroxyethoxy)-ethyl]-4-p-chloro-p'-fluoro-diphenyl-methylene)-piperidine.

9. 1-[2-(2-hydroxyethoxy)-ethyl]-4-(m-trifluoromethyl-diphenyl-methylene)-piperidine.

10. 1-(2-hydroxyethyl)-4-(diphenyl-methylene)-piperidine.

11. 1-(2-hydroxyethyl)-4-(p-fluoro-diphenyl-methylene)-piperidine.

* * * * *